(12) United States Patent
Taylor (10) Patent No.: US 7,876,204 B2
(45) Date of Patent: Jan. 25, 2011

(54) THERMAL RADIATION DETECTOR

(75) Inventor: Ronald M. Taylor, Greentown, IN (US)

(73) Assignee: Delphi Technologies, Inc., Troy, MI (US)

( * ) Notice: Subject to any disclaimer, the term of this patent is extended or adjusted under 35 U.S.C. 154(b) by 308 days.

(21) Appl. No.: 12/011,327

(22) Filed: Jan. 25, 2008

(65) Prior Publication Data

US 2009/0189752 A1 Jul. 30, 2009

(51) Int. Cl.
*B60Q 1/00* (2006.01)

(52) U.S. Cl. ................... 340/435; 340/567; 374/130

(58) Field of Classification Search ........... 340/435, 340/904, 567, 588, 589; 374/120, 121, 130; 250/221, 338.1, 342, 353
See application file for complete search history.

(56) References Cited

U.S. PATENT DOCUMENTS

| | | | |
|---|---|---|---|
| 4,523,095 A * | 6/1985 | Keller-Steinbach | ......... 250/353 |
| 5,218,345 A | 6/1993 | Muller et al. | |
| 5,331,311 A | 7/1994 | Doctor | |
| 5,668,539 A | 9/1997 | Patchell | |
| 6,184,782 B1 * | 2/2001 | Oda et al. | ................ 340/435 |
| 6,753,766 B2 | 6/2004 | Patchell | |
| 6,961,006 B2 | 11/2005 | Harter, Jr. et al. | |
| 7,081,817 B2 * | 7/2006 | Zhevelev et al. | ............ 340/567 |
| 7,148,482 B2 | 12/2006 | Harter, Jr. | |
| 7,202,776 B2 | 4/2007 | Breed | |
| 2004/0148063 A1 | 7/2004 | Patchell | |
| 2005/0040947 A1 * | 2/2005 | Buckley et al. | ............. 340/567 |
| 2006/0067378 A1 | 3/2006 | Rege et al. | |

OTHER PUBLICATIONS

European Search Report dated May 11, 2009.

\* cited by examiner

*Primary Examiner*—Thomas J Mullen
(74) *Attorney, Agent, or Firm*—Thomas N. Twomey (57) ABSTRACT

An object detection system is provided for detecting a thermal emitting object in a blind zone proximate to a host vehicle. The system includes a thermal radiation detector located on a host vehicle and configured to sense temperature of multiple coverage zones proximate to the host vehicle. A processor processes temperature sensed by an infrared detector. The processor determines a change in thermal temperature sensed by the infrared detector and determines the presence of an object in the coverage zone based on the change in the sensed temperature. An output provides a signal indicative of an object sensed in the coverage zone based on the determined change in temperature. The thermal radiation detector may include a first infrared detector configured to measure temperature of a first coverage zone by receiving infrared radiation from the first coverage zone, and a second infrared detector configured to measure temperature of second and third coverage zones by receiving infrared radiation from the second and third coverage zones.

1 Claim, 6 Drawing Sheets

THERMAL RADIATION DETECTOR

TECHNICAL FIELD

The present invention generally relates to temperature based detection and, more specifically, relates to a system and method for detecting thermal radiation emitted from an object proximate to a vehicle such as in a blind zone.

BACKGROUND OF THE INVENTION

Automotive vehicles are commonly equipped with exterior side view mirrors positioned on opposite sides of the vehicle to allow the driver to see a portion of the roadway generally behind and to the sides of the host vehicle with only a slight shift of the eyes or turn of the driver's head. When changing lanes, the driver may view the side of the vehicle via the appropriate side view mirror to confirm that the adjacent lane of the roadway is clear to make a lane change. Unfortunately, many vehicles exhibit a space that is generally unviewable via the mirrors, commonly referred to as the "blind spot" or "blind zone."

To help vehicle drivers negotiate the roadway, detection systems have been proposed to detect objects located within a vehicle blind spot region. Additionally, warning systems may be provided to alert vehicle operators of detected objects that may be a collision hazard when the object is in close proximity to the host vehicle. For example, when changing lanes, the vehicle warning system may warn of an object located in the lane adjacent to the vehicle, particularly in a blind zone which may not be easily viewable by the driver. The warning may allow sufficient reaction time for the vehicle operator to respond to prevent an undesirable collision.

Detection systems have been proposed that employ various sensing arrangements for detecting an object and alerting the driver of the host vehicle of the presence of an object in the blind spot region. Examples of proposed vehicle detection systems are disclosed in U.S. Pat. Nos. 6,961,006; 6,753,766 and 5,668,539, the entire disclosures of which are hereby incorporated herein by reference. The approaches disclosed in the aforementioned patents generally employ passive infrared sensors, such as thermopile sensors, to detect changes in the thermal scene along the side of a host vehicle to detect the presence of a thermal emitting object, such as another vehicle, in a blind spot region of the vehicle. Some of these proposed detection techniques generally employ a time shift in sensed thermal temperature measurements so as to generally match the sensing zones to the speed of the vehicle.

Additionally, the thermal radiation detectors employed by various proposed blind spot detection systems typically employ multiple thermal detection sensors having separate lens elements and duplicative components. Examples of thermal radiation detectors are disclosed in U.S. Pat. No. 7,148,482 and U.S. Patent Application Publication No. 2006/0067378, the entire disclosures of which are hereby incorporated herein by reference. Some infrared detection systems may not adequately detect smaller objects, such as compact vehicles and motorcycles, and may not timely detect movement of such vehicles into the host vehicle blind zone, particularly from a distance beyond the adjacent lane.

It is therefore desirable to provide for a blind spot detection system that detects objects, such as another vehicle, in a timely fashion. It is further desirable to provide for a thermal radiation detector that may be employed on a vehicle to adequately detect objects in various sizes, including compact vehicles.

SUMMARY OF THE INVENTION

According to one aspect of the present invention, a thermal radiation detector is provided for sensing thermal energy in multiple coincident zones relative to a vehicle. The thermal radiation detector includes a first infrared sensor configured to sense temperature of a first coverage zone by receiving infrared radiation from the first coverage zone, and a second infrared sensor configured to sense temperature of second and third coverage zones by receiving infrared radiation from the second and third coverage zones. The thermal radiation detector also includes first focusing optics for directing the infrared radiation from the first coverage zone towards the first infrared sensor, second focusing optics for directing infrared radiation from the second coverage zones towards the second infrared sensor, and third focusing optics for directing infrared radiation from the third coverage zone towards the second infrared sensor. The temperature of the first, second and third coverage zones is coincidentally sensed.

According to another aspect of the present invention, the first, second and third focusing optics includes first, second and third reflector surfaces, respectively, which may be implemented as a compound reflector.

According to yet a further aspect of the present invention, a method of detecting a thermal emitting object proximate to a host vehicle is provided. The method includes the steps of directing thermal energy from a first coverage zone proximate to a host vehicle to a first infrared sensor, and sensing temperature of the first coverage zone proximate to the vehicle with the first infrared sensor. The method also includes the steps of directing thermal energy from a second coverage zone proximate to the host vehicle to a second infrared sensor and directing thermal energy from a third coverage zone proximate to the host vehicle to the second infrared sensor. The method further includes the steps of sensing temperature of the second and third coverage zones with the second infrared sensor and determining the presence of a thermal emitting object proximate to the vehicle based on coincidentally sensed temperatures of the first, second and third coverage zones.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
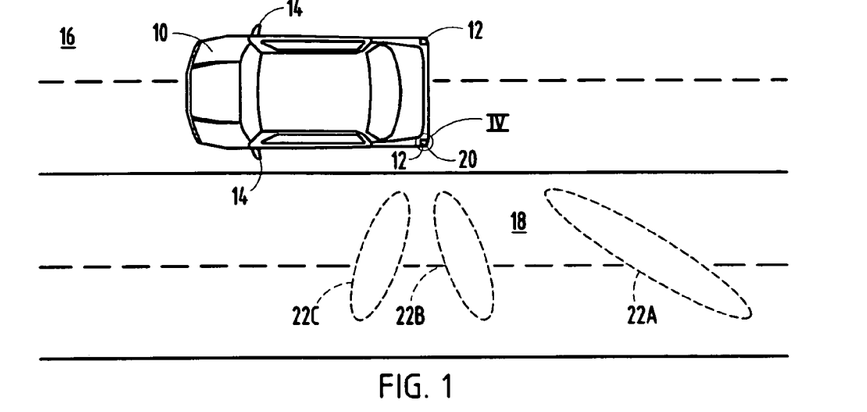
FIG. 1 is a schematic diagram of a host vehicle driven on a roadway and equipped with a blind spot object detection system, according to one embodiment of the present invention.

Referring now to FIG. 1, a host vehicle 10, such as an automobile, is generally illustrated equipped with a thermal radiation detector 20 for use in an object detection system employing multiple infrared sensors for coincidentally sensing multiple coverage zones, according to one embodiment of the present invention. The thermal radiation detector 20 is shown mounted on the host vehicle 10 generally in the rear tail lamp assembly 12 on a first lateral side of the host vehicle for sensing thermal emitting objects proximate to the first side of the host vehicle 10. However, it should be appreciated that a thermal radiation detector 20 may also be mounted on the opposite second lateral side of the host vehicle 10, such as in the opposite tail lamp assembly 12, for sensing one or more thermal emitting objects proximate the second side of the host vehicle 10.

The host vehicle 10 is generally shown traveling on a roadway 16, in a first lane of the roadway. Adjacent to the first lateral side of the host vehicle 10 is an adjacent second lane of the roadway upon which other vehicles 70, referred to as object vehicles, may travel. The host vehicle 10 is shown equipped with a pair of exterior side view mirror assemblies 14 which generally allow the driver (operator) of the host vehicle 10 to see a portion of the side of the vehicle 10. As is common with most vehicles, a space that is generally unviewable via the rearview minors 14, commonly referred to as the blind spot or blind zone 18, may exist in which the driver may not have a clear view of that space on the roadway, including objects on the roadway. The thermal detector 20 senses thermal energy in multiple coverage zones 22A-22C, generally in the vicinity of the blind zone 18, and the object detection system processes the sensed temperature to detect thermal emitting objects in the blind zone 18 to aid the driver in maneuvering the host vehicle 10.

Figure 2:
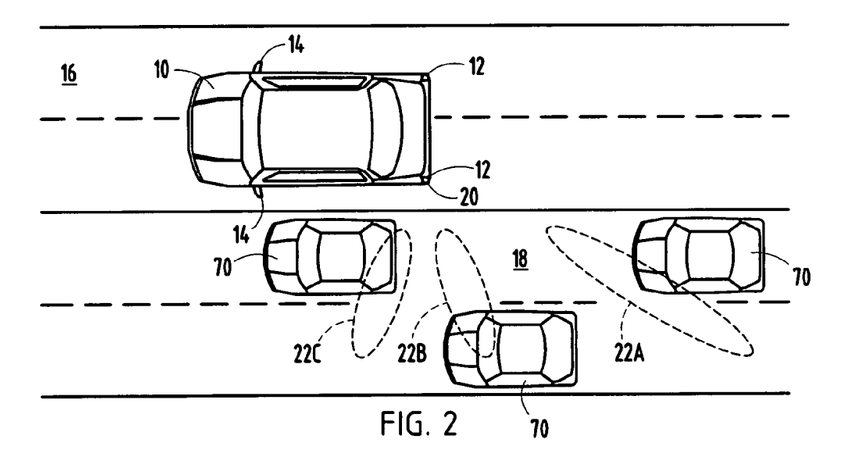
FIG. 2 is a schematic diagram of the host vehicle in relation to sensed compact cars in a vehicle blind spot zone.

The thermal detector 20 is shown in the embodiments of FIGS. 1 and 2 coincidentally detecting thermal energy within three separate and distinct coverage zones, namely zones 22A, 22B and 22C. The thermal detector 20 senses temperature of the first coverage zone 22A with a first infrared detector, and senses temperature of the second and third coverage zones 22B and 22C with a second infrared detector, according to one embodiment. The coverage zones 22A, 22B and 22C are configured and located to detect separate distinct areas within the blind zone 18, so as to coincidentally sense thermal emitting objects, such as object vehicles 70 as shown in FIG. 2. The thermal detector 20 detects thermal emitting objects in the coverage zones 22A, 22B and 22C proximate to the vehicle such as in the adjacent lane generally toward the side and rear of the host vehicle 10, typically in a blind zone 18.

As a heat emitting object, such as an object vehicle 70, approaches a coverage zone, such as coverage zone 22A, the infrared detector sensing temperature within that coverage zone 22A detects the increase in thermal energy from the heat emitting object 70. Thermal energy is typically generated and emitted by a motor vehicle 70 and may include thermal energy generated by the engine of the object motor vehicle 70 which may be radiated along the roadway or thermal energy generated by the tire/road interface of the object vehicle 70. It should also be appreciated that thermal energy could be emitted from other objects, such as persons, animals or other heat emitting objects, all of which could be detected by thermal detector 20.

In the example shown, an object automotive vehicle 70 which generates thermal energy is detected by the infrared thermal detector 20. As the object vehicle 70 or other thermal emitting object proceeds through the blind zone 18 of host vehicle 10, the object vehicle 70 may depart one coverage zone and enter another coverage zone, thus providing the object detection system with an indication of the current location and trajectory of the thermal emitting object 70 relative to the host vehicle 10.

Figure 3:
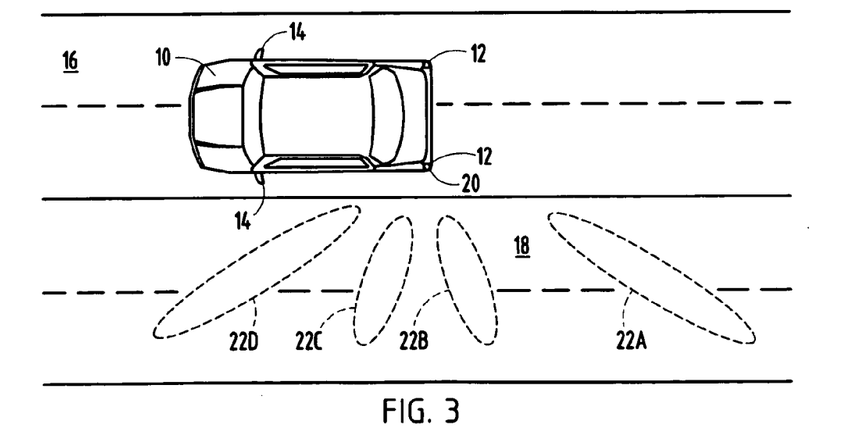
FIG. 3 is a schematic diagram of the host vehicle employing a blind spot object detection system having an additional coverage zone, according to another embodiment.

It should be appreciated that the thermal detector 20 may be located at various other locations onboard the host vehicle 10 to sense thermal energy (temperature) in each of the plurality of coverage zones. For example, the thermal detector 20 could be located on a side body panel, or an exterior side mounted rearview mirror housing on the host vehicle 10. It should also be appreciated that more than three coverage zones may be covered with the thermal radiation detector 20. Referring to FIG. 3, the thermal radiation detector 20 is shown covering four coverage zones 22A-22D, generally within the blind zone 18 of the host vehicle 10. In this embodiment, a first infrared detector may detect temperature within the first coverage zone 22A, a second detector may detect temperature within the second and third coverage zones 22B and 22C, and a third infrared detector may detect thermal energy within the fourth coverage zone 22D. While the second thermal detector shown and described herein is configured to detect thermal energy within the second and third coverage zones 22B and 22C, it should be appreciated that separate infrared detectors may be employed according to other embodiments to cover the respective coverage zones 22B and 22C.

Figure 4:
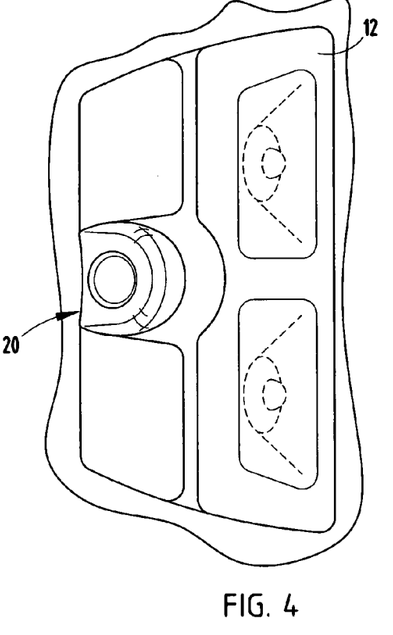
FIG. 4 is an enlarged view of section IV of FIG. 1 further illustrating the thermal detector employed in the rear tail lamp assembly of the vehicle.

Referring to FIG. 4, the thermal detector 20 is generally shown integrally formed within the rear tail lamp assembly 12 of the host vehicle 10. In this embodiment, the thermal detector 20 is generally directed toward the coverage zones of the host vehicle 10 at the rear end of the host vehicle 10. While the thermal detector 20 is shown and described herein mounted within a tail lamp assembly 12 according to one embodiment, it should be appreciated that the detector 20 may be located elsewhere on the host vehicle 10.

Figure 5:
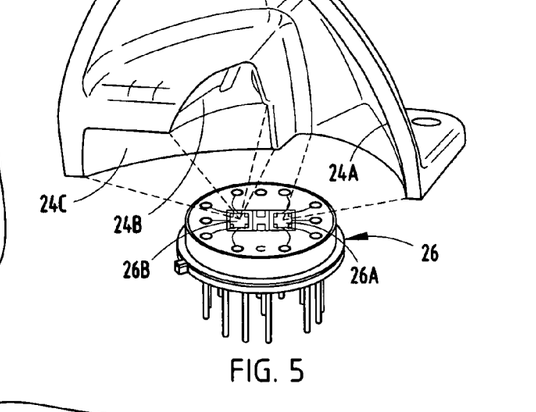
FIG. 5 is an exploded view of a portion of the thermal detector further showing a compound reflector and two thermopiles, according to one embodiment.
Figure 6:
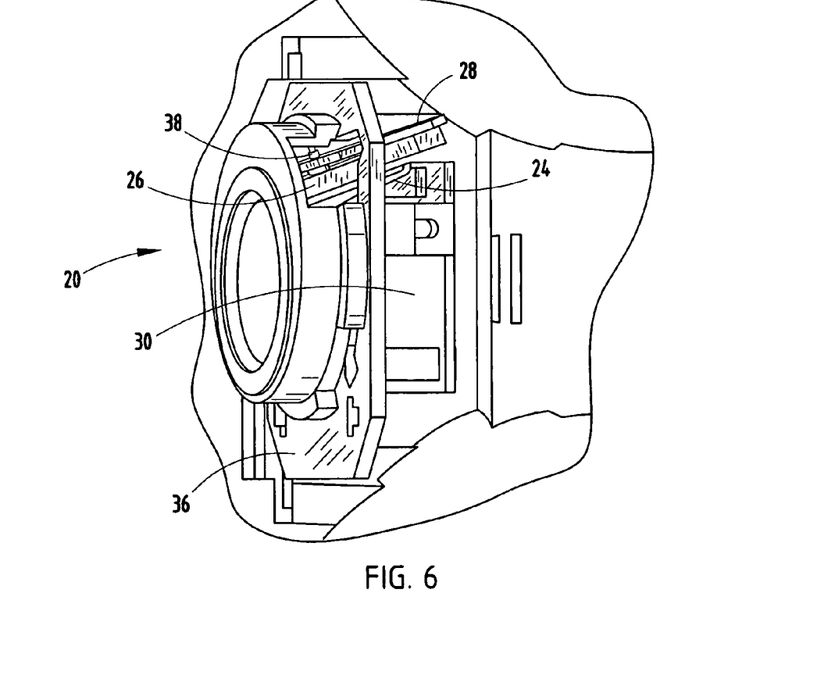
FIG. 6 is a perspective cross-sectional view of the thermal detector.

Referring to FIGS. 5 and 6, the thermal detector 20 is generally shown having a bracket 36 engaging a heat sink 38. Disposed within the heat sink 38 is a thermopile assembly 26 having first and second thermopiles 26A and 26B. The thermopile assembly 26 is arranged relative to a compound mirror 24 having first, second and third reflective surfaces 24A-24C. A sensor board 28 and a controller board 30 are also provided in the thermal detector 20. The thermopile assembly 26 is mounted onto the sensor board 28 and is positioned relative to the mirror 24 to receive thermal energy reflected therefrom. The controller board 30 has a processor and memory and may include other circuit components.

The thermopile assembly 26 is configured with two thermopiles 26A and 26B, according to the first embodiment. The thermopiles 26A and 26B are passive infrared (IR) sensors that may be mounted onto a common printed circuit board of the thermopile assembly 26. One example of a commercially available thermopile may include Model No. ZTP 315DZ, which is commercially available from General Electric. The aforementioned thermopile senses temperature and may further record remote temperature measurements and provide for signal conditioning, linearization and ambient temperature compensation.

In the embodiment shown, the minor 24 is a compound reflective mirror having a surface contour providing a first reflective surface 24A configured to focus thermal energy sensed from the first coverage zone 22A onto the first thermopile 26A, a second reflector surface 24B configured to focus thermal energy detected from the second coverage zone 22B onto the second thermopile 26B, and a third reflector surface 24C configured to focus thermal energy from the third coverage zone 22C onto the second thermopile 26B. Accordingly, thermal energy from the second and third coverage zones 22B and 22C is reflected via reflective surfaces 24B and 24C, respectively, onto a single common thermopile 26B. The first, second and third reflective surfaces serve as respective first, second and third energy focusing optics, according to one embodiment. It should be appreciated that the thermopile assembly 26 may utilize the tail lamp assembly 12 as a housing or may further include a separate housing having an aperture or two apertures which allow thermal energy from the corresponding reflective surfaces 24A-24C to be directed onto the thermopiles 26A and 26B.

Figure 7:
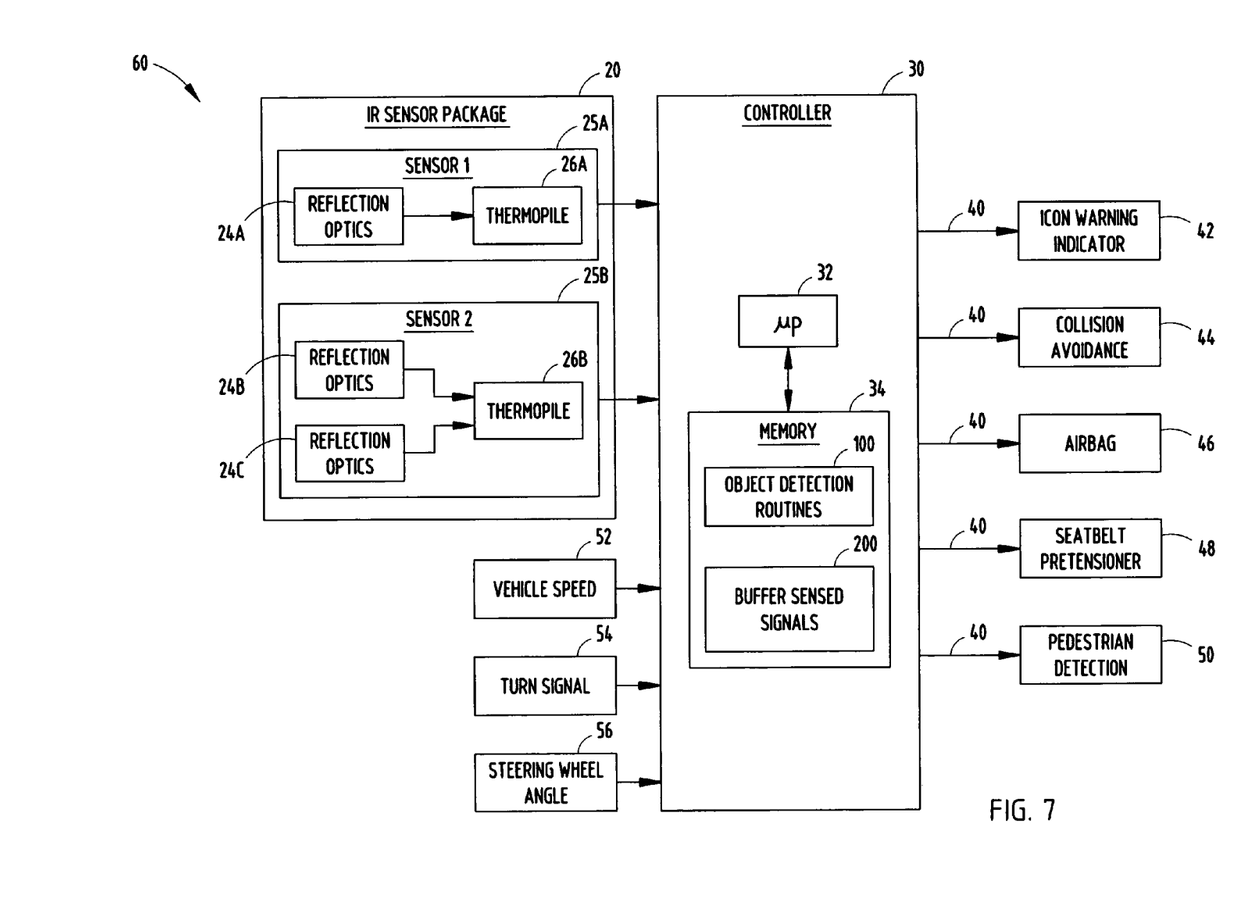
FIG. 7 is a block diagram illustrating the object detection system, according to one embodiment.

Referring to FIG. 7, an object detection system 60 for use on a host vehicle is shown employing the thermal radiation sensor package 20, according to one embodiment. The infrared detector 20 includes a first infrared sensor 25A having reflection optics 24A directing thermal energy to first thermopile 26A, and a second infrared sensor 25B having the pair of reflection optics 24B and 24C directing thermal energy to second thermopile 26B. The reflection optics 24A, 24B and 24C serves as thermal energy focusing optics that may be implemented as reflective surfaces, according to the disclosed embodiment. In addition, the object detection system 60 also includes a controller 30 having a microprocessor 32 for processing signal outputs from both the first and second infrared sensors 25A and 25B, in addition to receiving the vehicle speed 52, vehicle turn signals 54, and steering wheel angle signals 56.

The controller 30 may include a controller dedicated to thermal detection processing and/or object detection, or may include a shared controller, such as a body controller of the host vehicle 10, according to one example. The microprocessor 32 may include a conventional digital microprocessor or equivalent digital and/or analog circuitry capable of processing algorithms and sensed data. Also included in controller 30 is memory 34 which may include electronically-erasable programmable read-only memory (EEPROM) or other commercially available volatile or non-volatile memory devices. Stored within memory 34 and processed by microprocessor 32 are object detection routines 100 for detecting one or more objects emitting thermal radiation and initiating one or more countermeasures. The object detection routines 100 include steps performed to process signal outputs of the thermopiles 26A and 26B, according to one embodiment. Also stored in memory 34 is a buffer of sensed signals which include the consecutively sampled thermopile signal outputs from first and second infrared sensors 25A and 25B that are processed by microprocessor 32.

The controller 30 may include a single microprocessor for executing one or more object detection routines 100 to process the outputs of the individual thermopiles 26A and 26B which coincidentally sense thermal energy from coverage zones 22A-22C. Alternately, a dual-processor may be employed to execute the object detection routines 100 in order to provide the computer resources for executing the logic of the object detection routines coincidentally for each sensor output. In either embodiment, the outputs of the thermopiles 26A and 26B are individually and independently processed to determine a rate of change of temperature sensed by each of the sensors, and then the presence of a thermal emitting object within the coverage zones sensed by each sensor is determined.

The object detection system 60 is further shown including outputs 40 of controller 30. The outputs include signals indicative of an object sensed within one or more of the coverage zones based on the change in temperature. The output signals 40 may be provided to one or more countermeasure devices. Examples of countermeasure devices shown include an icon warning indicator 42, such as an illuminated icon on a vehicle instrument display, to provide an indication to the driver of the host vehicle that a thermal emitting object has been detected in the blind zone. Other countermeasures include a collision avoidance system 44 which may employ an output signal 40 to avoid or minimize collision with a detected object. Additionally, an output signal 40 may be applied to one or more air bags 46 and one or more seatbelt pretensioners 48 to initiate deployment or prepare for deployment when a collision is anticipated based on the output signal 40. Further, a pedestrian detection system 50 may employ the output signal 40, particularly if the object detected may be a pedestrian.

Figure 8:
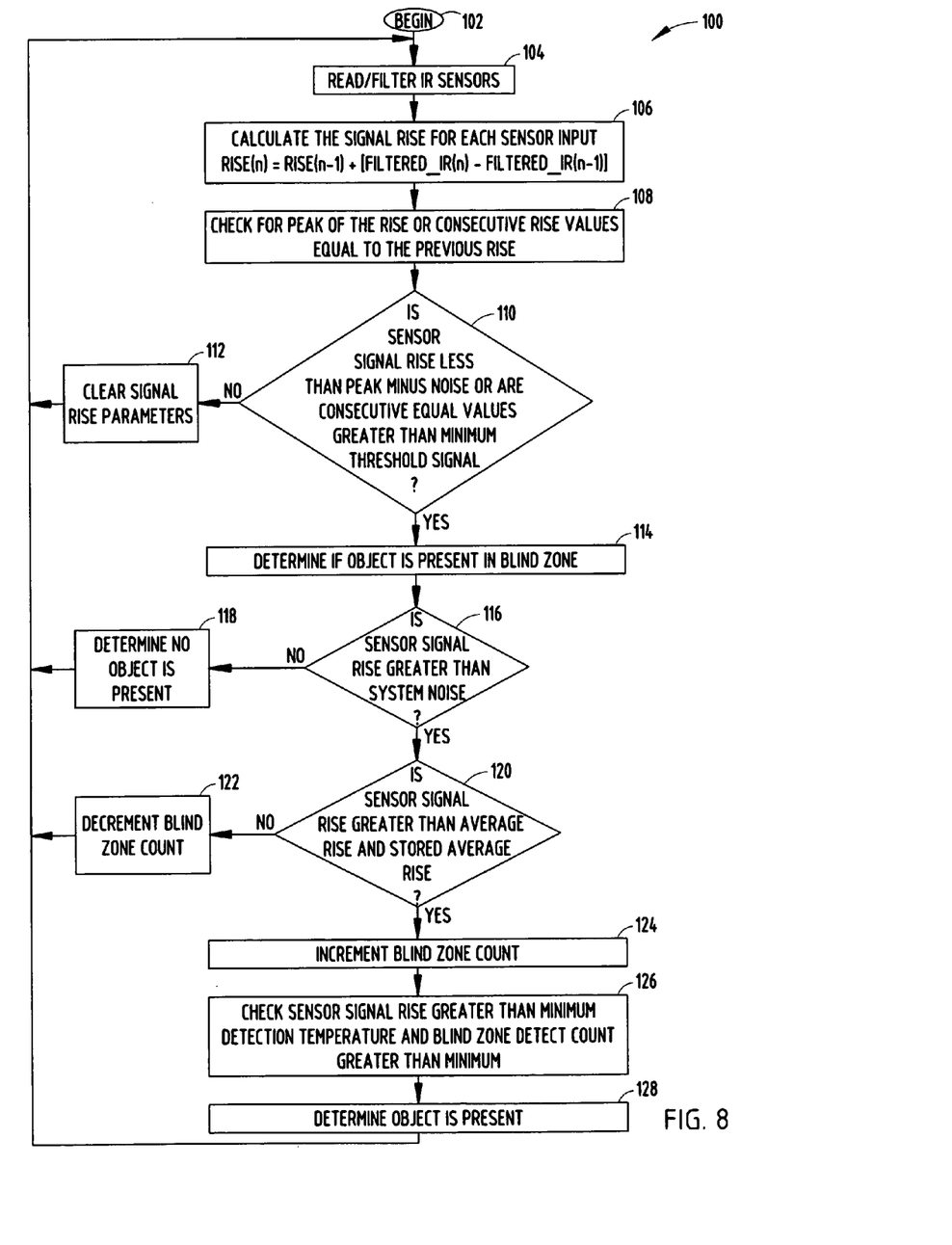
FIG. 8 is a flow diagram illustrating a routine for detecting an object with the object detection system, according to one embodiment.

Referring to FIG. 8, an object detection routine 100 is shown according to one embodiment. Routine 100 begins at step 102 and proceeds to read and filter the sensed infrared sensor signals in step 104. Essentially, successively sampled signals from each thermopile are read and filtered and stored on a memory buffer. Next, in step 106, routine 100 independently calculates the sensor signal rise for each sensor which is indicative of the rate of change of sensed temperature in the corresponding sensed coverage zone. As shown by the equation in block 106, the sensed signal rise is determined by adding the previous sampled temperature rise to the difference in the current filtered sensed signal and the prior filtered sensed signal. The routine 100 then checks for the peak of the rise in temperature or consecutive temperature rise values equal to the previous temperature rise in step 108.

Routine 100 then proceeds to decision step 110 to determine if the sensed temperature rise is less than the peak minus noise or if consecutive equal values are greater than the minimum threshold signal value above noise (e.g., 0.5° Celsius). The minimum threshold value represents the lowest signal above noise that is representative of an object vehicle's thermal signal characteristic. If the rise in temperature is less than the peak minus the noise or if the consecutive equal values are greater than the minimum threshold signal for a minimum amount of time (e.g., 150 milliseconds), then routine 100 proceeds to determine if one or more thermal emitting objects are present in the corresponding coverage zone of the blind zone in step 114. If the rise is not less than the peak minus noise and if the consecutive equal values are not greater than the minimum threshold signal for a minimum amount of time (e.g., 150 milliseconds), routine 100 proceeds to clear the signal rise parameters in step 112 and returns to step 100.

To determine if objects are present in a given coverage zone of the blind zone, routine 100 proceeds to decision step 116 to determine if the corresponding sensor temperature rise is greater than the system noise. This may be determined by comparing the sensed temperature signal amplitude to a long term temperature average. The long term average may be computed over several successive samples, such as one hundred twenty-eight (128) samples. If the sensor temperature rise for a given sensor is not greater than the system noise, routine 100 proceeds to determine that no object is present in that coverage zone in step 118, and then returns to step 104. If the sensor temperature rise for a given sensor is greater than the system noise, routine 100 proceeds to decision step 120 to determine if the sensor temperature rise is greater than an average temperature rise and stored average temperature rise and, if not, decrements of blind zone count for that coverage zone in step 122, before returning to step 104. In one embodiment, the average rise is the sample weighted numerical average of the sensor signal temperature values over the number of samples (e.g., 1° Celsius representing the total signal), and the stored average rise is then the average rise value less the noise (which is typically at least 0.7° Celsius). The stored average rise indicates the lowest average signal above noise that is representative of an object vehicle's thermal signal characteristic. If the sensor temperature rise for a given sensor is greater than the average temperature rise and stored average temperature rise, routine 100 proceeds to step 124 to increment the blind zone count for that coverage zone. Thereafter, in step 126, routine 100 checks for whether the sensor temperature rise is greater than the minimum detection temperature and if the blind zone detection count is greater than the minimum and then proceeds to determine that an object is present in the corresponding coverage zone in step 128. Following the determination of a heat emitting object present in the blind zone, routine 100 returns to step 104 to repeat the steps.

It should be appreciated that routine 100 may process the output of one of the infrared sensors to determine the presence of an object in the one or more coverage zones that correspond to that infrared detector. In doing so, the routine 100 may be executed in parallel to coincidentally process the sensor output signals of each of the infrared detectors.

The object detection system 60 and method 100 provide for a robust object detection discrimination technique that utilizes temperature sensing within individual coverage zones and determines a temperature signal change as a primary input parameter to detecting the presence of a thermal emitting object within each coverage zone. According to one embodiment, an initial value may be employed as the reference or base line signal with the rate of change (or first derivative) over time of the thermal signals used to indicate a changing signal response. According to another embodiment, the difference between each successive sample's difference to itself (i.e., prior measurement) is used to indicate a changing thermal signal response. The temperature increase due to an object vehicle's signature can be measured independent of the background and independent of the changes that might be occurring with another zone's thermal measurement. Characterization of the object vehicle's thermal signature (i.e., temperature) provide a method to track or evaluate over a time period that an object vehicle is traversing in the blind zone 18. The discrimination of a desired detection of an object vehicle over the undesired detection of stopped objects (e.g., parked car, guard rail) or fixed clutter (e.g., shadows, asphalt patch) is based on a direct comparison of the temperature characteristics of the moving object to stopped objects as the objects are sampled in real time. Since stopped objects cannot continue to be sampled by the host vehicle's thermal detection system as the host vehicle is moving, the continuing sampled waveform of the object vehicle can be used as a highly robust temporal characteristic for discrimination of a moving object vehicle sampled against a nonmoving background.

Figure 9:
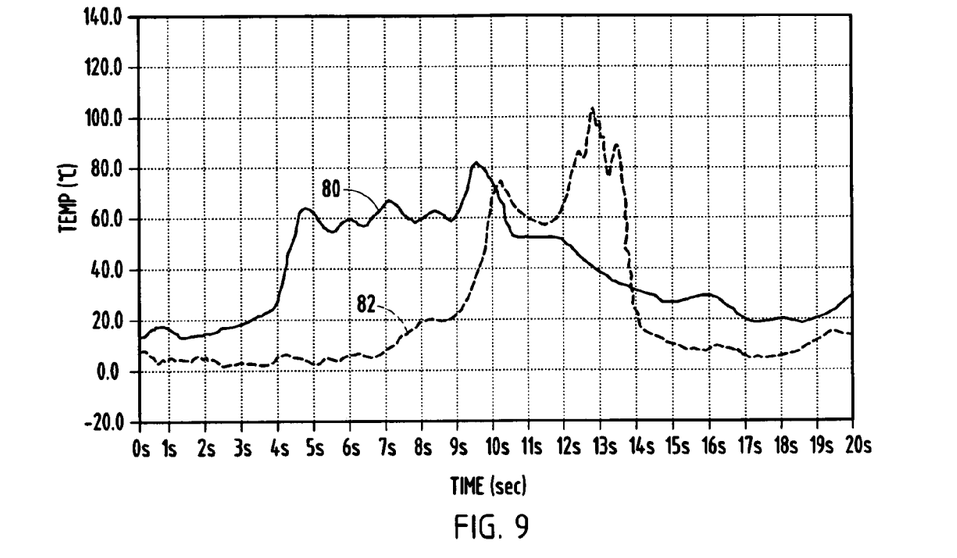
FIG. 9 is a graph illustrating sensed temperature within front and rear coverage zones, according to one example of a vehicle driving scenario.
Figure 9A:
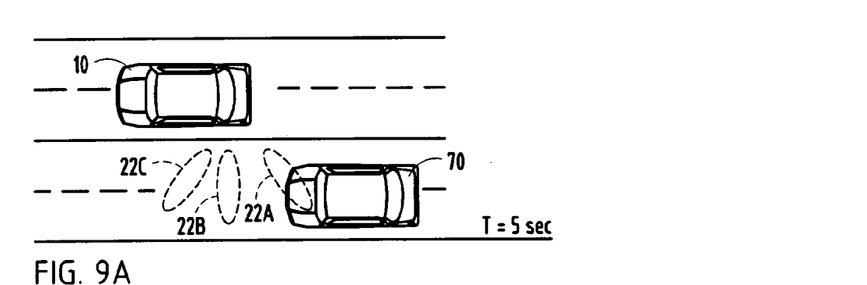
FIGS. 9A-9C are schematic diagrams illustrating the coverage zones and objects present in a series of driving scenes sensed as shown in FIG. 9.
Figure 9B:
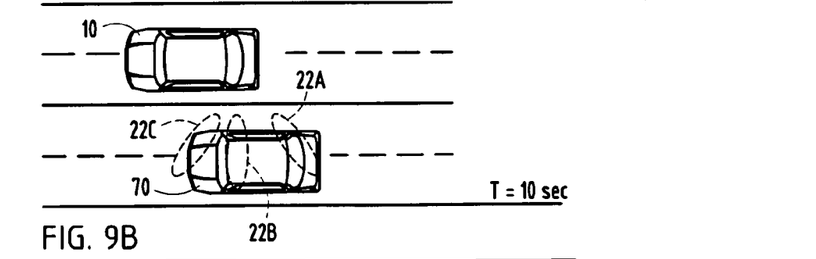
Figure 9C:
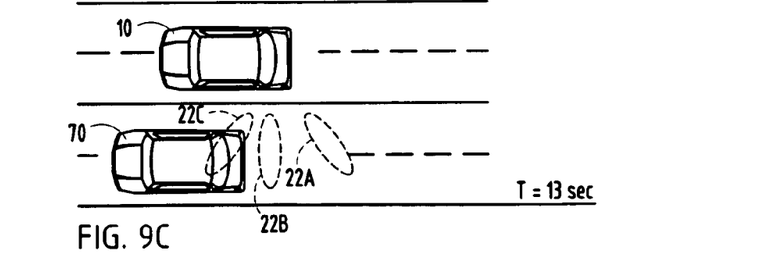

Referring to FIGS. 9 and 9A-9C, an example of sensed temperature outputs 80 and 82 from sensor 25A and 25B, respectively, are illustrated during a vehicle driving scenario shown in FIGS. 9A-9C, in which a thermal emitting object, such as an object vehicle 70, approaches and passes the host vehicle 10 in the adjacent lane. In doing so, the object vehicle 70 passes through the blind zone 18 of host vehicle 10. During this driving scenario, as the object vehicle 70 approaches the blind zone 18, the first sensor 25A detecting thermal radiation from first coverage zone 22A initially senses a change in temperature which is processed to determine the presence of the object vehicle 70. The temperature for sensor 25A is indicated by reference numeral 80 in FIG. 9. As the object vehicle 70 proceeds forward relative to host vehicle 10, the object vehicle 70 enters and passes through coverage zones 22B and 22C which are sensed by the second sensor 25B. The second sensed signal output is represented by waveform 82.

The waveforms 80 and 82 illustrate the two thermal sensing outputs where each sampled signal is referenced to its own prior value and the rate of change is used over time to determine presence of a thermal emitting object in the corresponding coverage zones. The sampled signals 80 and 82 representing the moving object vehicle 70 are independent of each other and of clutter, such as shadows that may be generated while the moving object vehicle signals are being sampled. It should be appreciated that thermal variations may exist on the roadway, such as shadows and changes in the roadway material, such as asphalt versus concrete, and that these temperature variations may be picked up with the thermal sensors at other times when moving object vehicles are not in the sampled blind zone. The sampling approach employed by the object detecting system 60 of the present invention minimizes interaction of the clutter.

Figure 10:
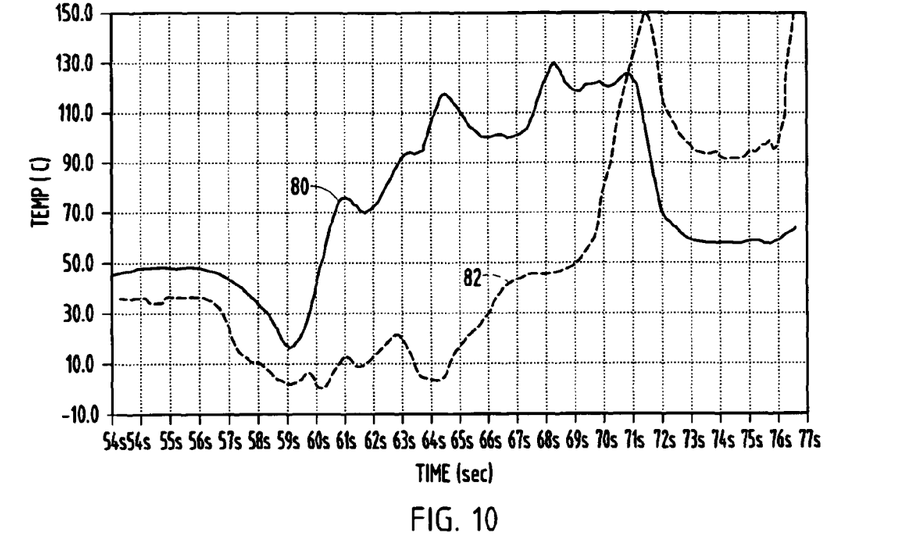
FIG. 10 is a graph illustrating sensed temperature with front and rear coverage zones, according to another example of a vehicle driving scenario.
Figure 10A:
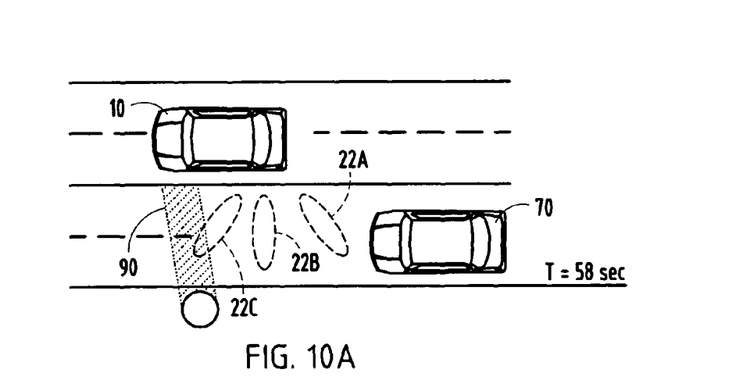
FIGS. 10A-10B are schematic diagrams illustrating the coverage zones and objects in a series of driving scenes sensed as shown in FIG. 10.
Figure 10B:
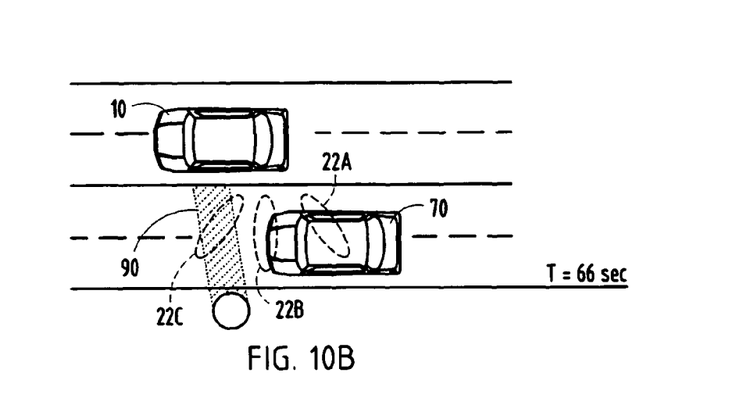

Referring to FIGS. 10 and 10A-10B, an example of sensed temperature outputs 80 and 82 from sensors 25A and 25B are illustrated during a driving scenario that includes thermal transitions (e.g., shadow 90) in the blind zone 18. This driving scenario presents an increased difficulty for target discrimination measurements. The thermal transitions, such as shadow 90, create a comparison or differential signal between the multiple coverage zones. As seen in FIG. 10, the sensed temperature waveforms 80 and 82 for each of the two thermal sensed signals is shown where each sample zone is referenced to its own prior value and the rate of change of temperature is used over time. The sampling signal 80 representative of the moving object vehicle 70 shown in FIG. 10A is independent of the shadow 90 present on the roadway shown in the coverage zone 22C while the moving object vehicle is being sampled by coverage zone 22A. The thermal transition temperature deviation on the roadway which may include an overpass on the roadway, shadows, road pavement material or construction changes and other random thermal clutter backgrounds may cause a temperature transition.

The object detection system 60 of the present invention uses rate of change of each sensor signal input independently of other coincidentally sensed sensor signal inputs. The temperature rise is the key thermal signal input representative of a moving object vehicle and is processed to filter out clutter such as a shadow signal 90 on the roadway. By independently processing the individual sensor signals, the background noise or clutter is filtered to prevent degradation in the ability to discriminate the moving object.

The object detection system 60 of the present invention advantageously senses thermal emitting objects in a manner that optimizes object detection by separating the moving object generated signals from any local background changes and allows the signal above noise to be accumulated. The target discrimination technique may be optimized for IRSA data bandwidth, such as about five milliseconds cycle time, and is applicable to IRSA symmetric or asymmetric application configurations and may be implemented with one or more sensor sampling spots. In addition to the sampling and background independence, the object detection technique of the present invention advantageously provides computational efficiencies. Since there is no differential comparison of multi-spot signals, the requirement for accurate measurement in either in time, distance or relative value, between the spot measurements is eliminated as is the need for precise measurements of host vehicle velocity. This technique also is independent of the number of field positions used to sample the adjacent lanes around the host vehicle and does not require a multi-spot field to have equivalent coverage areas to function correctly.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. A method of detecting a thermal energy emitting object proximate to a host vehicle, said method comprising the steps of:

directing thermal energy from a first coverage zone proximate to a host vehicle to a first infrared sensor;

sensing temperature of the first coverage zone proximate to the vehicle with the first infrared sensor;

directing thermal energy from a second coverage zone proximate to the host vehicle to a second infrared sensor;

directing thermal energy from a third coverage zone proximate to the host vehicle to the second infrared sensor;

sensing temperature of the second and third coverage zones with the second infrared sensor; and determining the presence of a thermal emitting object proximate to the vehicle based on coincidentally sensed temperatures of the first, second and third coverage zones, wherein the step of determining presence of a thermal emitting object comprises determining a temperature difference relative to a prior temperature within the first coverage zone and a temperature difference relative to a prior temperature within the second and third coverage zones, wherein an object is detected within a corresponding coverage zone when the temperature difference relative to a prior temperature for that zone exceeds a threshold.

* * * * *